UNITED STATES PATENT OFFICE.

MARION MAE OSBORN, OF LONE TREE, NORTH DAKOTA.

CONDIMENT.

1,405,070.  Specification of Letters Patent.  Patented Jan. 31, 1922.

No Drawing.  Application filed August 9, 1919.  Serial No. 316,404.

*To all whom it may concern:*

Be it known that I, MARION M. OSBORN, a citizen of the United States, residing at Lone Tree, in the county of Ward and State of North Dakota, have invented new and useful Improvements in Condiments, of which the following is a specification.

This invention relates to condiments for meats and other food articles, and its object is to provide a condiment having rhubarb for its base.

The condiment is composed of the following ingredients in the proportions stated:

| | |
|---|---|
| Rhubarb stalk (pie plant) cut fine | 4 quarts. |
| Onions (bulb) cut fine | 1 quart. |
| Vinegar | 1½ quarts. |
| Granulated sugar | 1 quart. |
| Cinnamon | 1 teaspoonful. |
| Nutmeg | 1 teaspoonful. |
| Allspice | 1 teaspoonful. |
| Celery seed | ¼ teaspoonful. |

In preparing the condiment, the rhubarb stalks are cut into small pieces and the onions are cut in slices and chopped fine, after which both are put into a kettle with the vinegar and boiled until the mixture is soft. The mixture is then placed in a colander and rubbed through the same, resulting in a well blended, smooth mass which is seasoned with the spices and sugar, and then boiled again until it attains the desired thickness. The product is then placed in bottles or other containers, and sealed. Although rhubarb cooks somewhat quicker than onions, it is nevertheless possible to cook both together as stated, owing to the fact that the onions are chopped fine.

The product is wholesome and has a pleasing flavor, and it is used in the same manner as tomato catchup to season or give relish to meats and other articles of food.

The purpose of the onions is to modify the flavor of the rhubarb sufficiently so that the finished product is a condiment rather than a fruit sauce. If the onions were left out, the product could not be used as a condiment as it would then be more in the nature of a fruit sauce.

I claim:

A condiment having for its base rhubarb and onions cooked in vinegar.

In testimony whereof I affix my signature.

MARION MAE OSBORN.